Aug. 27, 1940.  O. GAMRADT ET AL  2,212,517
TRAILER HITCH
Filed April 8, 1939  2 Sheets-Sheet 1
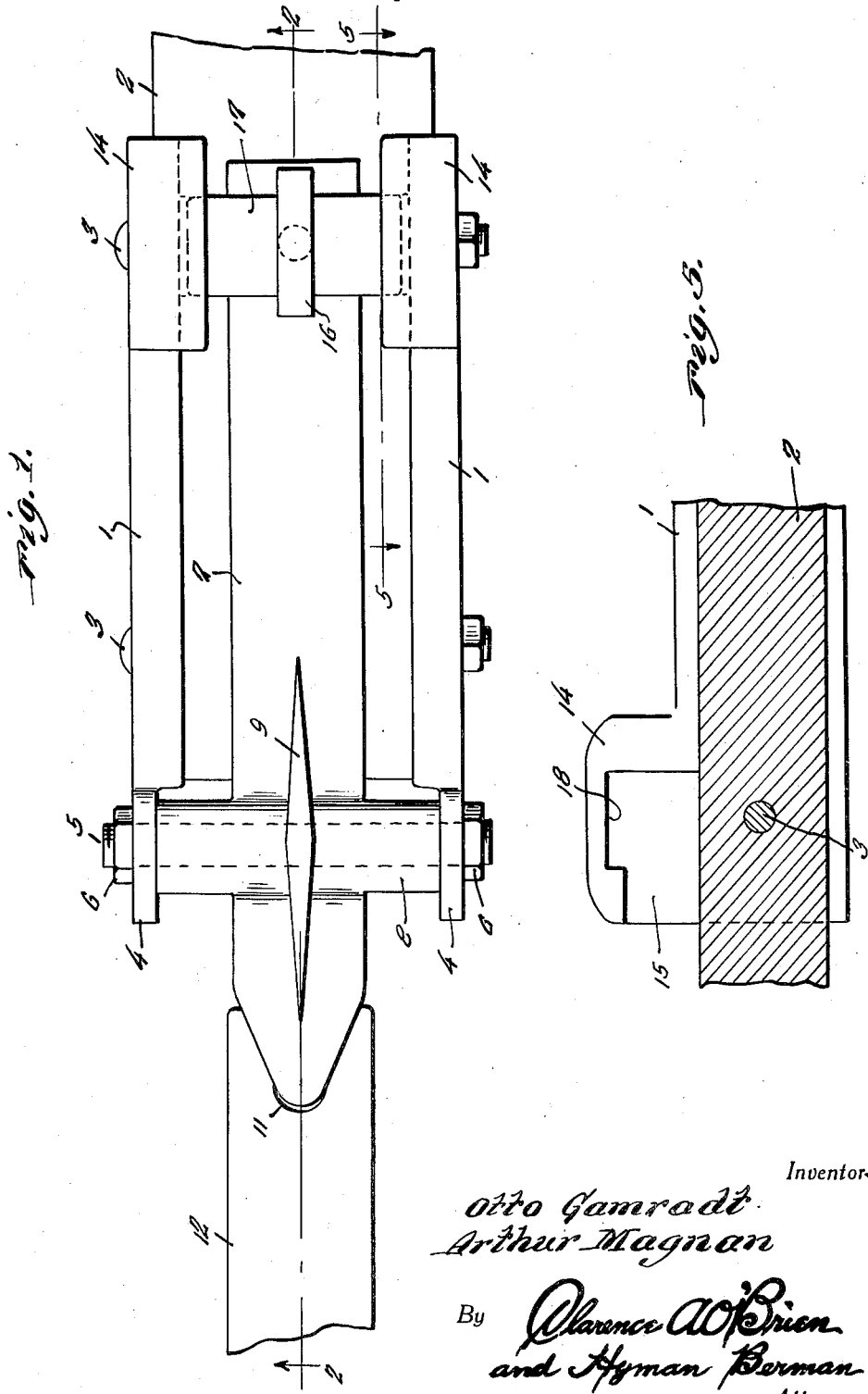
Inventors
Otto Gamradt
Arthur Magnan
By Clarence A. O'Brien
and Hyman Berman
Attorneys

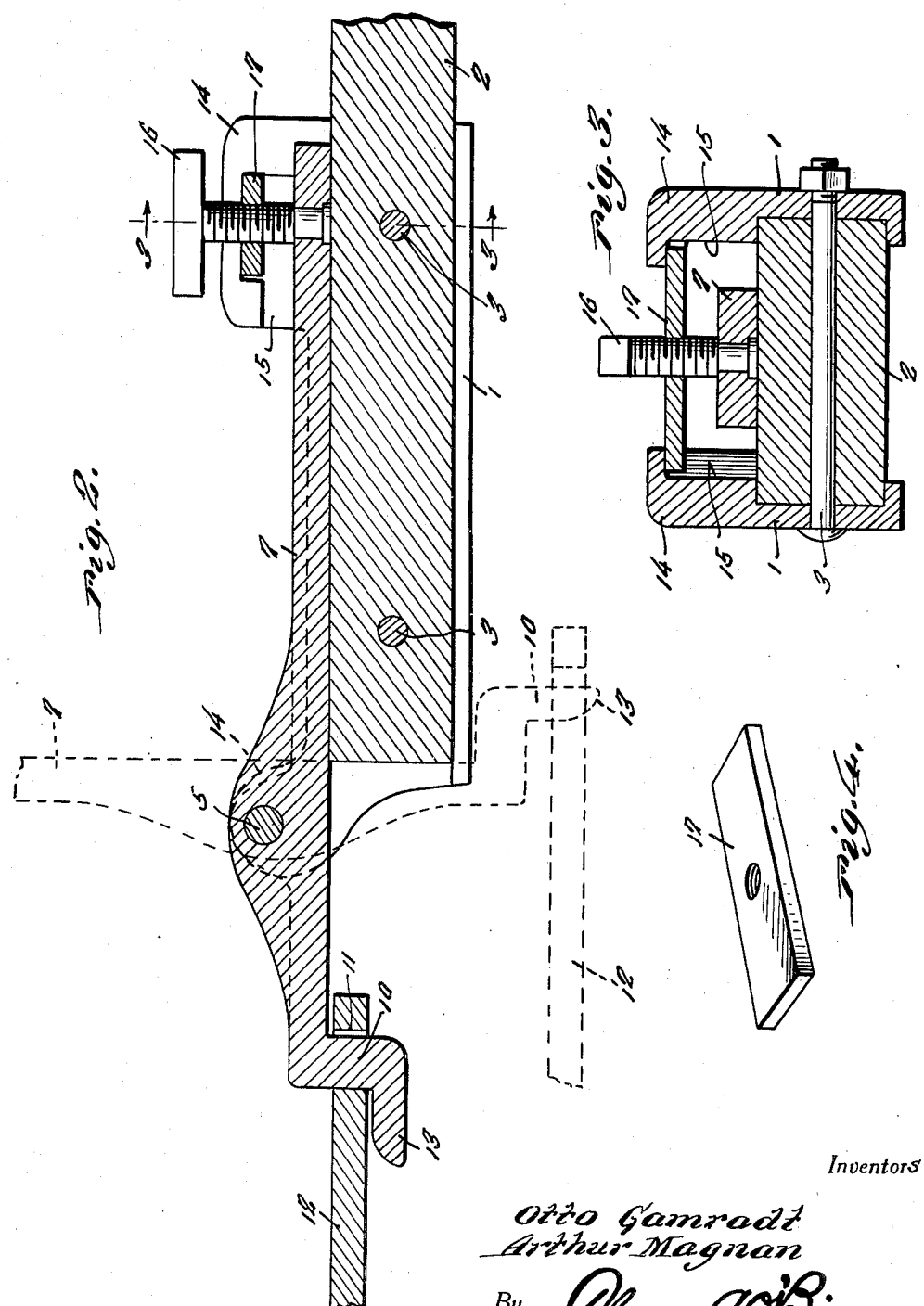

Patented Aug. 27, 1940

2,212,517

UNITED STATES PATENT OFFICE 2,212,517

TRAILER HITCH

Otto Gamradt and Arthur Magnan,
Brainerd, Minn.

Application April 8, 1939, Serial No. 266,874

3 Claims. (Cl. 280—33.15)

The present invention relates to new and useful improvements in trailer hitches and has for its primary object to provide, in a manner as hereinafter set forth, a device of this character embodying novel means for preventing accidental detachment or disconnection from the towing vehicle.

Another very important object of the invention is to provide, in a trailer hitch comprising a lever pivotally mounted on the trailer tongue and including a hook on one end, novel means on the other end of said lever and the tongue for releasably locking said lever in operative position.

Other objects of the invention are to provide a trailer hitch of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a trailer hitch constructed in accordance with the present invention.

Figure 2 is a view in vertical longitudinal section through the device, taken substantially on the line 2—2 of Fig. 1.

Figure 3 is a cross sectional view, taken substantially on the line 3—3 of Fig. 2.

Figure 4 is a detail view in perspective of the locking bar.

Figure 5 is a fragmentary view in vertical longitudinal section, taken substantially on the line 5—5 of Fig. 1 but with the locking bar omitted.

Referring now to the drawings in detail, it will be seen that the embodiment of the invention which has been illustrated comprises a pair of flanged plates 1 of suitable metal which are secured longitudinally on the sides of the forward end portion of the trailer tongue 2 through the medium of bolts 3. Integral ears 4 are provided on the forward ends of the plates 1, said ears projecting upwardly and forwardly relative to the trailer tongue 2. Extending between the ears 4 is a pin 5 which is secured by nuts 6.

The reference numeral 7 designates a metallic lever which is pivotally mounted, at an intermediate point, between the ears 4 for swinging movement in a vertical plane. Toward this end, the lever 7 has formed integrally therewith, at an intermediate point, a transverse bearing 8 which is journaled on the pin 5. This portion of the lever 7 is reenforced, as at 9.

At its forward end, the swinging lever 7 terminates in a downturned hook 10 which is engageable in an opening 11 which is provided therefor in the rear end portion of a hitch bar 12 on the rear of the towing vehicle (not shown). Projecting at right angles from the free end of the hook 10 is a bill 13 which prevents withdrawal of said hook from the opening 11. This is shown to advantage in Fig. 2 of the drawings.

Rising from the rear end portions of the plates 1 are what may be referred to as opposed ears 14. The ears 14 have formed in their opposed inner sides bayonet grooves or recesses 15. The bayonet grooves or recesses 15 extend into the ears 14 from the opposite ends thereof. Rotatably mounted on the rear end portion of the lever 7 is a thumb screw 16. Threadedly mounted on the thumb screw 16 is a lock bar 17 the end portions of which are engageable in the portions 18 of the bayonet grooves or recesses 15.

It is thought that the operation of the device will be readily apparent from a consideration of the foregoing. Briefly, to connect the trailer to the bar 12, the rear end of the lever 7 is released to permit said lever to be swung to a vertical position on the pin 5, as suggested in dotted lines in Fig. 2 of the drawings. With the lever 7 in this position the bill 13 is inserted through the opening 7 in the bar 12. Then, the lever 7 is swung downwardly to a horizontal position on the tongue 2 and the hook 10 enters the opening 11, the bill 13 swinging upwardly beneath the bar 12. The locking bar 17 is then swung to a transverse position on the thumb screw 16, thereby engaging the end portions of said bar in the bayonet grooves or recesses 15 beneath the portions 18 thereof. The thumb screw 16 is then rotated in a manner to thread the bar 17 upwardly and engage the end portions of said bar in the portions 18 of the bayonet grooves 15. Thus, the swinging lever 7 is positively locked in operative position. The hitch may, of course, be used for any purpose other than for connecting a trailer for which it may be found adapted and desirable.

It is believed that the many advantages of a trailer hitch constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A trailer hitch comprising a pair of plates mounted on a trailer tongue, a lever pivotally mounted, at an intermediate point, between said plates, a hook on one end of the lever engageable with a hitch bar on a towing vehicle, and coacting means on the other end portion of the lever and the plates for releasably locking said lever in operative position, said means including a thumb screw rotatably mounted on the lever, a locking bar threadedly mounted on said thumb screw, and means on the plates for receiving and retaining the end portions of said locking bar.

2. A trailer hitch comprising a pair of plates mounted on a trailer tongue, a lever pivotally mounted, at an intermediate point, between said plates and adapted for swinging movement in a vertical plane, a hook on one end of said lever engageable in a hitch bar on a towing vehicle, ears rising from one end portion of the plates, said ears having bayonet grooves in their opposed walls, a thumb screw rotatably mounted on the lever, and a bar threadedly mounted on said thumb screw with its end portions engageable in the bayonet grooves of the ears for releasably locking the lever against swinging movement in operative position on the trailer tongue.

3. A trailer hitch of the character described, comprising a pair of flanged plates secured longitudinally on the sides of a trailer tongue on the forward end portion thereof, integral ears on the forward ends of the plates extending upwardly and forwardly therefrom, a pin extending between said ears, a lever, a transverse bearing integral with the lever at an intermediate point journalled on the pin for mounting the lever thereon for swinging movement in a vertical plane, a hook on one end of the lever engageable in a hitch bar on a towing vehicle, a retaining bill projecting at right angles from the free end of the hook, ears rising from the rear end portions of the plates, said ears having bayonet grooves in their opposed walls, a thumb screw rotatably mounted on the rear end portion of the lever, and a locking bar threadedly mounted on said thumb screw, the end portions of said locking bar being engageable in the bayonet grooves in the second named ears for locking the lever in operative position against swinging movement on the trailer tongue.

OTTO GAMRADT.
ARTHUR MAGNAN.